US 11,700,792 B2

(12) United States Patent
Turner et al.

(10) Patent No.: US 11,700,792 B2
(45) Date of Patent: Jul. 18, 2023

(54) TORQUE SMOOTHING APPARATUSES FOR LARGE SQUARE BALERS

(71) Applicant: Deere & Company, Moline, IL (US)

(72) Inventors: Christopher D. Turner, Waterloo, IA (US); William J. Vande Haar, Janesville, IA (US); Darin L. Roth, Batavia, IA (US)

(73) Assignee: DEERE & COMPANY, Moline, IL (US)

( * ) Notice: Subject to any disclaimer, the term of this patent is extended or adjusted under 35 U.S.C. 154(b) by 735 days.

(21) Appl. No.: 16/664,644

(22) Filed: Oct. 25, 2019

(65) Prior Publication Data

US 2021/0120745 A1   Apr. 29, 2021

(51) Int. Cl.
*A01F 15/08*   (2006.01)
*F16H 3/66*   (2006.01)
(Continued)

(52) U.S. Cl.
CPC ........ *A01F 15/0841* (2013.01); *A01F 15/042* (2013.01); *B30B 9/3007* (2013.01); *F16H 3/66* (2013.01)

(58) Field of Classification Search
CPC .... A01F 15/0841; A01F 15/042; A01F 15/04; B30B 9/3007; B30B 9/3021;
(Continued)

(56) References Cited

U.S. PATENT DOCUMENTS

| 5,894,718 A * | 4/1999 | Hawlas ............... A01F 15/0841 |
| | | 100/88 |
| 6,105,353 A * | 8/2000 | Mohr ................... A01D 69/005 |
| | | 475/2 |

(Continued)

FOREIGN PATENT DOCUMENTS

| DE | 19621391 A1 | 12/1997 |
| DE | 19628604 A1 | 1/1998 |
| WO | WO2014154790 A1 | 10/2014 |

OTHER PUBLICATIONS

Racecar Engineering (Sam Collins), Flywheel Hybrid Systems (KERS)—Racecar Engineering, https://www.racecar-engineering.com/articles/f1/flywheel-hybrid-systems-kers/, Chelsea Magazine Company, 2019. (5 pages).

(Continued)

*Primary Examiner* — Matthew Katcoff
*Assistant Examiner* — Teresa A Guthrie
(74) *Attorney, Agent, or Firm* — Klintworth & Rozenblat IP LLP

(57) ABSTRACT

A torque smoothing apparatus is utilized in conjunction with a large square baler (LSB), which includes a bale chamber, a plunger mounted for reciprocation within the bale chamber, and an LSB drive line. In embodiments, the torque smoothing apparatus includes a planetary gear train and a flywheel, which is mechanically coupled to the LSB drive line through the planetary gear train. An auxiliary motor having a motor output is mechanically coupled to the LSB drive line through the planetary gear train, while a controller (Continued)

is operably coupled to the auxiliary motor. The controller commands the auxiliary motor to selectively apply torque to the LSB drive line such that the torque applied by the auxiliary motor, taken in combination with a torque contribution of the flywheel, reduces variations in torque demands placed on a vehicle engine as the plunger reciprocates during LSB bale formation.

16 Claims, 10 Drawing Sheets

(51) Int. Cl.
*B30B 9/30* (2006.01)
*A01F 15/04* (2006.01)

(58) Field of Classification Search
CPC . B30B 9/305; B30B 9/306; F16H 3/66; F16H 3/666; B60K 6/10; B60K 6/105; B60K 6/30; B60K 17/00; B60K 17/04; B60K 17/28; B60K 20/00
USPC .......................................................... 74/665 R
See application file for complete search history.

(56) References Cited

U.S. PATENT DOCUMENTS

| | | |
|---|---|---|
| 6,651,416 B2 | 11/2003 | Trelstad et al. |
| 6,701,834 B2 | 3/2004 | Roth |
| 7,727,114 B2 | 6/2010 | Tarasinski et al. |
| 8,113,114 B2 | 2/2012 | Schlesser et al. |
| 8,577,559 B2 | 11/2013 | Hel et al. |
| 9,277,692 B2 | 3/2016 | Roth |
| 9,562,592 B2 | 2/2017 | Rekow et al. |
| 9,730,391 B2 * | 8/2017 | Bonte ...................... A01F 15/04 |
| 9,736,988 B2 * | 8/2017 | Lang ................... A01F 15/0841 |
| 10,058,037 B2 | 8/2018 | Kraus |
| 10,091,942 B2 * | 10/2018 | Retzlaff .............. A01F 15/0841 |
| 10,408,310 B2 | 9/2019 | Gugel et al. |
| 2014/0137757 A1 | 5/2014 | Nelson et al. |
| 2018/0084723 A1 | 3/2018 | Gresch et al. |
| 2018/0317388 A1 | 11/2018 | Gresch et al. |
| 2018/0317394 A1 | 11/2018 | Benevelli et al. |

OTHER PUBLICATIONS

Wikipedia, Kinetic Energy Recovery System, https://en.wikipedia.org/wiki/Kinetic_energy_recovery_system, Sep. 21, 2019. (7 pages).
PUNCH Flybrid, Products—PUNCH Flybrid, https://punchflybrid.com/products/, undated, admitted prior art. (1 page).
German Search Report issued in German application No. 102020211498.6 dated Jun. 2, 2021 (10 pages).

\* cited by examiner

TORQUE SMOOTHING APPARATUSES FOR LARGE SQUARE BALERS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to torque smoothing apparatuses utilized in conjunction with large square balers, such as large square balers driven through the power takeoff shaft of a tractor or other work vehicle.

ABBREVIATIONS

Abbreviations appearing relatively infrequently in this document are defined upon initial usage, while abbreviations appearing more frequently in this document are defined below.
LSB—large square baler;
ms—milliseconds;
PTO—power takeoff; and
RPM—revolutions per minute.

BACKGROUND OF THE DISCLOSURE

In contrast to round balers, which rely upon a system of belts runs to form crop material into round bales, LSBs form generally rectangular or "square" crop bales utilizing a relatively large plunger mounted for reciprocation within a bale chamber. During LSB operation, the plunger compresses ingested crop material into layers or "flakes," which are compiled within the bale chamber to build-up square crop bales on a layer-by-layer basis. At the beginning or top of the plunger stroke, fresh crop material is fed into the bale chamber by a stuffer mechanism, which rakes or otherwise prompts flow of the crop material through a feed chute connected to a pick-up assembly. The crop material taken into the bale chamber is then compressed into a flake as the plunger extends into its bottom or full stroke position. This process is repeated to build-up a crop bale to a desired size within the bale chamber. After a given crop bale has reached its desired size, the crop bale is tied (e.g., by a knotter mechanism) and then ejected from a rear portion of the LSB. This readies the bale chamber for the formation of a new crop bale as the LSB is further towed across a crop field.

By conventional design, the plunger of the LSB is not independently powered by an engine or motor onboard the LSB itself, but rather driven by the engine of the tractor (or other work vehicle) to which the LSB is connected. The LSB drive line may terminate in a PTO coupler, which connects to a PTO shaft of the tractor when attached to the LSB. The LSB drive line includes one or more shafts, which co-rotate with the PTO shaft when rotationally driven by the tractor engine. Rotation of the LSB drive line is converted to reciprocal plunger motion by suitable mechanical components within the LSB, such as a gearbox and plunger crank arrangement. In this manner, the tractor engine is leveraged to drive plunger reciprocation during LSB bale formation, thereby eliminating the need to furnish the LSB with a separate engine (as a primary driver), reducing cost and complexity, while increasing operator convenience.

SUMMARY OF THE DISCLOSURE

A torque smoothing apparatus is provided for usage in conjunction with an LSB including a bale chamber, a plunger mounted for reciprocation within the bale chamber, and an LSB drive line. The LSB is attachable to a work vehicle having a vehicle engine. In embodiments, the torque smoothing apparatus includes a planetary gear train and a flywheel, which is mechanically coupled to the LSB drive line through the planetary gear train. The planetary gear train is further coupled between the flywheel and the LSB plunger. An auxiliary motor having a motor output is mechanically coupled to the LSB drive line through the planetary gear train, while a controller is operably coupled to the auxiliary motor. The controller commands the auxiliary motor to selectively apply torque to the LSB drive line such that the torque applied by the auxiliary motor, taken in combination with a torque contribution of the flywheel, reduces variations in torque demands placed on the vehicle engine as the plunger reciprocates within the bale chamber to form crop bales utilizing the LSB.

In further embodiments, the torque smoothing apparatus includes a planetary gear train, an auxiliary motor mechanically linked to the LSB drive line through the planetary gear train in a variable rotational relationship, and a flywheel further mechanically linked to the LSB drive line through the planetary gear train in a variable rotational relationship. A controller is operably coupled to the auxiliary motor. The controller commands the auxiliary motor to selectively apply torque to the LSB drive line through the planetary gear train such that the torque applied by the auxiliary motor, taken in combination with a torque contribution of the flywheel, reduces variations in torque demands placed on the vehicle engine during bale formation by the LSB.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
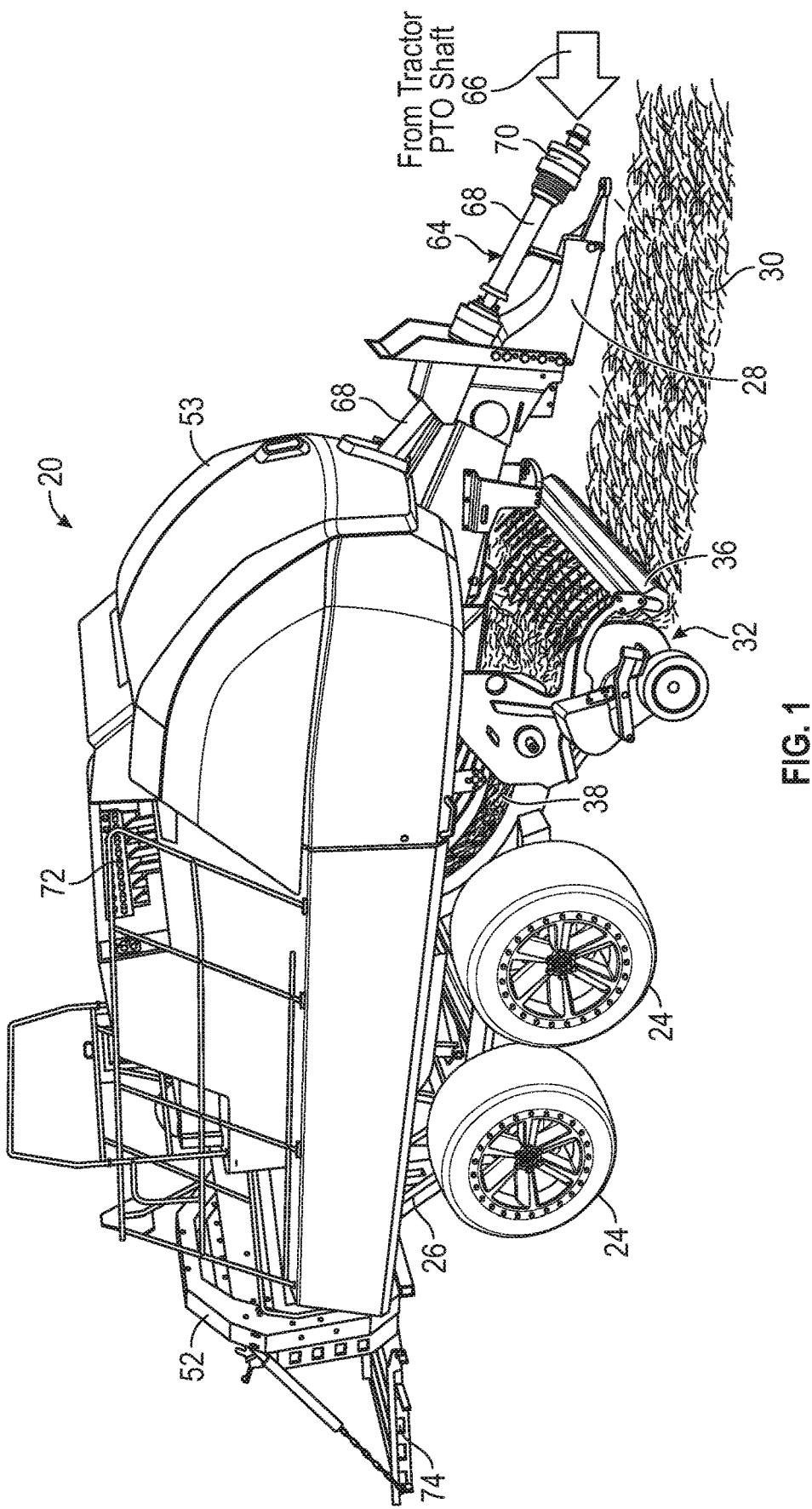
FIGS. 1 and 2 are perspective views of an example LSB suitably equipped with an embodiment of the torque smoothing apparatus, the example LSB shown with and without a cover piece, respectively.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As appearing throughout this document, the term "fixed rotational relationship" is utilized to describe two named components, the rotational speeds of which share a fixed relationship (e.g., 1:1 relationship or a 1:X relationship wherein X>1) during operation of the below-described torque smoothing apparatus. Conversely, the term "variable rotational relationship" is utilized in reference to two named components having rotational speeds capable of varying in a non-proportional manner during operation of the torque smoothing apparatus due to, for example, the provision of a variable transmission between the named components. Further, the term "large square baler" and the corresponding abbreviation "LSB," as appearing throughout this document, refer broadly to an agricultural machine in which at least one plunger reciprocates to compress crop material (e.g., on a layer-by-layer or flake-by-flake basis) into a crop bale for packing purposes, regardless of general bale shape or size.

OVERVIEW

As previously noted, LSBs often contain a single, relatively large plunger mounted for reciprocation in a bale chamber. During bale formation, movement of the plunger is driven by the engine of a work vehicle (typically, a tractor) utilized to tow the LSB across a crop field. As the plunger reciprocates within the bale chamber, the power requirements of the plunger (also expressed herein in terms of the "torque requirements" placed on rotary components contained the LSB drive line, the PTO shaft, or the vehicle engine) vary significantly in relation to the phase of the plunger stroke. When sliding toward the rear of the bale chamber to compress crop material into a flake or layer of a newly-formed crop bale, the plunger undergoes a compression phase characterized by high torque demands. In contrast, during retraction and the other phases of the plunger stroke, relatively little power (torque per unit time) is required to drive plunger movement. From a temporal standpoint, the high torque demand, compression phase of the plunger stroke typically constitutes a relatively small fraction (e.g., less than one third) of the overall duration of the plunger stroke cycle.

For the foregoing reasons, an LSB typically places highly cyclic torque demands on the engine of the vehicle utilized to power the LSB during bale formation. In certain instances, the peak energy (torque) or power (torque per unit time) demands placed on the vehicle engine by the LSB through the PTO shaft may approach, and perhaps briefly exceed, the torque output capabilities of the engine. In such instances, it is often impractical for the vehicle engine to govern PTO speed at a rate equivalent to the highly transient loading conditions of the plunger and LSB drive line. Several negative outcomes result. First, such rapid and pronounced cyclic loading of the vehicle engine tends to briefly and iteratively overload the engine, exacerbating wear and reducing the service lifespan of engine components. Second, such aggressive cyclic loading of the vehicle engine may result in engine "pulsing" and variances in ground speed of the vehicle utilized to tow the LSB across a crop field. This engine pulsing and ground speed variances are often perceptible to the vehicle operator and, thus, detract from operator experience.

For the reasons above, flywheel-based torque smoothing apparatuses are integrated into modern LSBs to help smooth-out (that is, render more uniform over time) the highly cyclic torque demands exerted on a vehicle engine when powering an LSB. As appearing herein, the term "torque smoothing" is utilized to describe the reduction of variances in loading (required torque output) placed on a vehicle engine when driving an LSB during bale formation. By common design, existing flywheel-based torque smoothing apparatuses employ high inertia flywheels, which are mechanically coupled to the PTO shaft of the tow vehicle (e.g., a tractor) in a fixed rotational relationship. Thus, in the context of such existing flywheel-based torque smoothing apparatuses, flywheel speeds varies in direct proportion to the rotational speed of the PTO shaft to reduce transient loads during the compression phase of the plunger stroke, while increasing loading on the vehicle engine during the other phases of the plunger stroke.

While helping to render more uniform the torque demands placed on a vehicle engine when powering an LSB during bale formation, existing flywheel-based torque smoothing apparatuses remain limited in several respects. As a primary limitation, such torque smoothing apparatuses often require the usage of a relatively massive, high inertia flywheels by design. Not only does this add cost and bulk to the LSB, but the usage of such massive flywheels detracts from the responsiveness of the torque smoothing apparatus. Consequently, the mass of a flywheel may become unacceptably large to reduce PTO speed variation to acceptable levels in certain instances. As an alternative to flywheel-based torque smoothing apparatuses, certain LSBs employ double-cycle plunger designs to better distribute the torque demands exerted on the tractor engine over the bale formation cycle. Such alternative designs are, however, typically considerably more complex and costly than single plunger LSB designs. An ongoing industry demand thus persists for the provision of flywheel-based torque smoothing apparatuses better able to reduce variations in PTO speed and engine loading during LSB bale formation and/or providing other benefits over existing flywheel-based torque smoothing apparatuses.

In satisfaction of this industry demand, improved flywheel-based torque smoothing apparatuses are disclosed for integration into, or usage in conjunction with, LSBs principally driven by a vehicle (tractor) engine during bale formation. Embodiments of the below-described torque smoothing apparatus utilize a unique combination of a summing planetary gear train, a flywheel, and a control system including an auxiliary motor (e.g., an electric or hydraulic motor) to produce an infinitely variable transmission (IVT) well-suited for torque smoothing when powering an LSB through a PTO shaft connected to the vehicle (tractor) engine. The flywheel, the auxiliary motor, and the LSB drive line are each connected to a different member of the planetary gear train in a fixed rotational relationship in embodiments, with the flywheel speed permitted to vary relative to the rotational speed of the LSB drive line and, therefore, the rotational speed of the PTO shaft. Concurrently, higher rotational speeds may enable lightening of the flywheel to increase responsiveness relative to conventional flywheel-based torque smoothing apparatuses. This, in turn, allows the flywheel speed to quickly increase or decrease as needed to store or to release energy, respectively, in a manner smoothing torque demands placed on the PTO shaft and vehicle engine to uniform or near uniform levels in many instances. Accordingly, through the incorporation of the below-described torque smoothing apparatus into a given LSB, improved uniformity in engine loading may be achieved to decrease engine wear and prolong component lifespan, while eliminating variances in work vehicle ground speed and enhancing operator experience.

Two example embodiments of the torque smoothing apparatus are described below in connection with FIGS. 3-10. First, however, an example LSB is described in conjunction with FIGS. 1 and 2 to provide a non-limiting illustrative context in which embodiments of the torque smoothing apparatus may be better understood. The following description notwithstanding, embodiments of the torque smoothing apparatus are not restricted to usage within any particular type of LSB. Additionally, while primarily described below as contained in an LSB utilized in conjunction with a tractor, it will be appreciated that the LSB into which the torque smoothing apparatus is incorporated can be utilized in conjunction with any suitable work vehicle capable of powering the LSB during bale formation.

Large Square Balers Including Example Torque Smoothing Apparatuses

Figure 2:
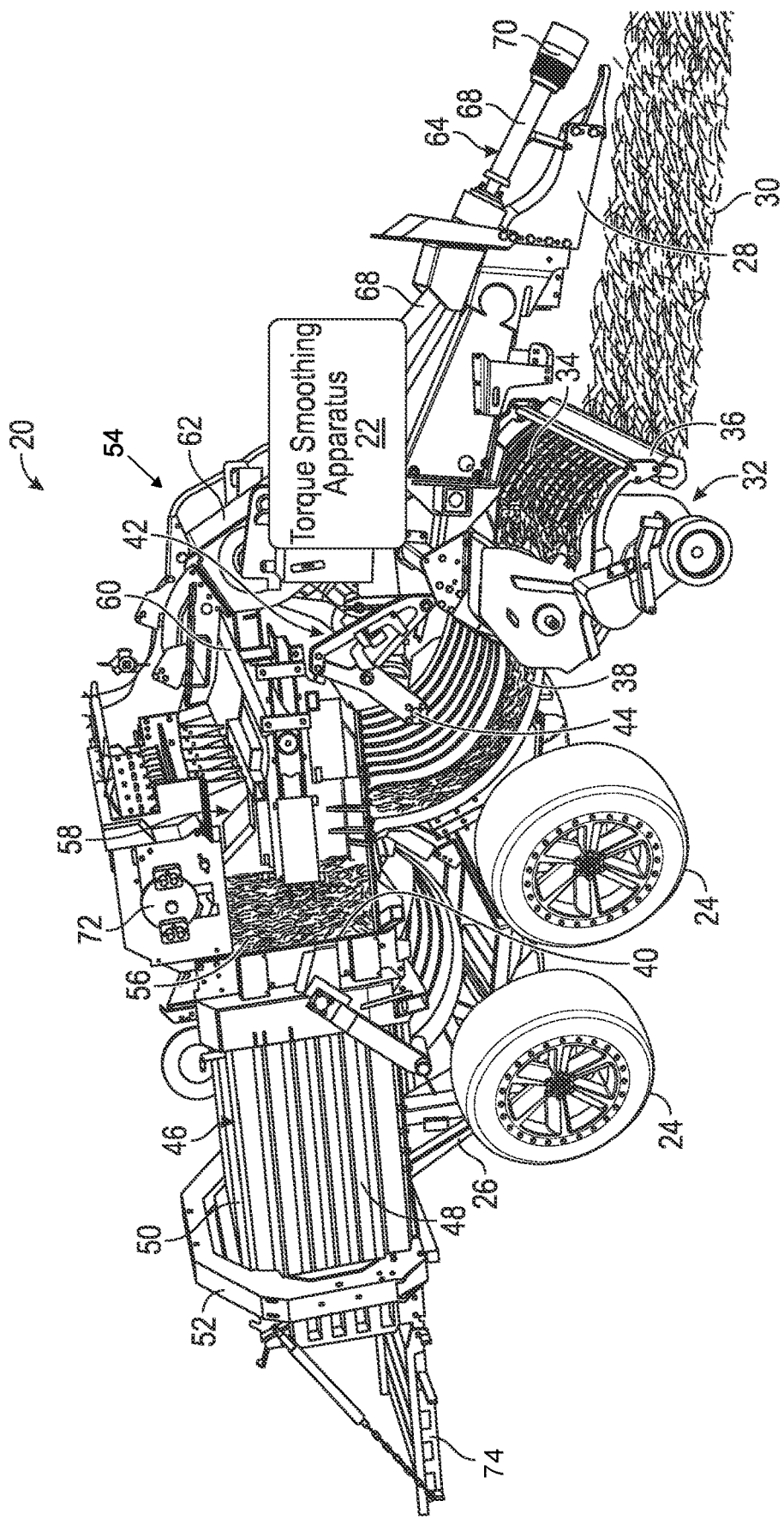

With reference to FIGS. 1 and 2, there is shown an LSB 20 equipped with a torque smoothing system or apparatus 22, as depicted in accordance with a first example embodiment. The LSB 20 includes two pairs of ground-engaging wheels 24, a chassis 26 supported by the ground-engaging wheels 24, and a tongue 28 extending from a forward or leading portion of the chassis 26. The tongue 28 facilitates attachment of the LSB 20 to a tractor (or other work vehicle) utilized to tow the LSB 20 across a crop field. As the LSB 20 is so towed, crop material 30 is taken into the LSB 20 via a pick-up assembly 32 including a rotary tine pickup 34 and a roller baffle 36. The crop material gathered into the LSB 20 by the pick-up assembly 32 is then passed through a feed chute or pre-compression chamber 38. A stuffier mechanism 42, including a packer fork 44 (FIG. 2), urges flow of the crop material (e.g., due to racking action of the packer fork 44) into an opening provided in a lower forward portion of the bale chamber 40 for flake compression.

The LSB 20 further includes a bale housing or case 46 (FIG. 2) in which the bale chamber 40 is provided. The bale case 46 is a generally rectangular, box-like structure including two side panels 48 (one of which can be seen), a lower panel (hidden from view), and a top panel 50. A compression cylinder assembly 52 surrounds an aft end portion of the bale case 46 and exerts an inward force on the panels 48, 50. This inward pressure promotes the formation of dense crop bales within the bale chamber 40 as the crop material is introduced into the bale chamber 40 and compressed by motion of a plunger (i.e., the LSB plunger 58, described below), which reciprocates within the bale chamber 40. As shown in FIG. 1, the bale case 46 and the other internal components of the LSB 20 are enclosed by an outer cover or casing 53 when the LSB 20 is fully assembled.

The LSB 20 further contains a plunger drive 54 (FIG. 2) including a piston or plunger 58, a plunger crank mechanism 60, and a gearbox 62. The plunger 58 is mounted for reciprocation with the bale chamber 40 (e.g., through a four bar linkage), while shaped and sized to substantially match the cross-sectional interior geometry of the chamber 40. Reciprocation of the plunger 58 within the bale chamber 40 is driven through an LSB drive line 64, which is, in turn, rotationally driven through the PTO shaft of the tractor (or other work vehicle) utilized to tow the LSB 20, as indicated by arrow 66 in FIG. 1. The LSB drive line 64 can include a single shaft or multiple shafts 68 interconnected for co-rotation; e.g., via one or more U-joints if the shafts 68 have a non-parallel orientation. The LSB drive line 64 further includes a PTO coupler 70, which connects to a mating coupler provided on a tractor when joined to the LSB 20. When the LSB 20 is connected to a tractor (or other work vehicle) in this manner, the tractor engine drives rotation of the tractor's PTO shaft, which, in turn, drives of the shaft(s) 68 included in the LSB drive line 64. Rotation of the drive line shaft(s) 68 is then converted to rotation of the plunger crank mechanism 60 by the gearbox 62, with rotation of the plunger crank mechanism 60 then driving reciprocation of the plunger 58 within the bale chamber 40.

As the plunger 58 reciprocates, the plunger 58 compresses the crop material 30 directed into the bale chamber 40 into compressed layers or flakes. As multiple flakes are formed in succession, the flakes are pressed together to gradually compile or build-up a square or rectangular crop bale 56. When the crop bale 56 reaches its desired size, the crop bale 56 is tied utilizing, for example, a knotter mechanism 72 onboard the LSB 20. The newly-tied crop bale 56 is then ejected from the rear of LSB 20 through an aft or trailing opening after lowering a rear gate 74. This process is then repeated to produce additional square bales as the LSB 20 is towed across the crop field in the manner previously described.

As discussed above, due to the nature of the bale formation process, exceptionally high torque loads or demands are placed on the tractor engine during the compression phase of the plunger stroke. Specifically, such torque demands are exerted on the tractor engine through the plunger crank mechanism 60, through the shaft(s) 68 includes in the LSB drive line 64, and ultimately through the tractor's PTO shaft connecting to the tractor engine. Otherwise, relatively low torque demands are placed on the tractor engine and the components of the LSB drive line 64 (including the plunger crank mechanism 60) during the remainder of the plunger stroke. The peak energy (e.g., the peak plunger crank torque) output required to maintain plunger movement during the compression phase will vary among embodiments. However, by way of non-limiting example, the peak energy requirements of the plunger 58 may approach or exceed 108 kilojoules (kJ) in certain instances, while peak plunger crank torque (exerted by the plunger crank mechanism 60) may exceed 100 kilonewtons per meter (kNm). Further, the high torque demand, compression phase of the plunger stroke typically constitutes a relatively small fraction of the overall duration of the plunger stroke. In an example scenario in which the plunger 58 operates at approximately 45 strokes per minute and each plunger stroke requires approximately 1333 ms to complete, the compression phase of the plunger stroke may have a duration of approximately 350 to 400 ms.

To smooth-out (that is, render more uniform over time) such variances in the torque load placed on the vehicle engine when driving the LSB 20 during bale formation, the LSB 20 is further equipped with the torque smoothing apparatus 22 generically shown in FIG. 2. As a point of emphasis, the torque smoothing apparatus 22 can assume various different forms, but may generally include a planetary gear train, a flywheel, an auxiliary motor, and a control system. The flywheel, the auxiliary motor, and the LSB drive line 64 may each be connected to a different member of the planetary gear system in a rotationally-fixed relationship, with the control system governing operation of the auxiliary motor to regulate the speed of the flywheel, as described below. Such an arrangement effectively allows the flywheel speed to vary relative to PTO speed, while permitting the auxiliary motor to regulate flywheel speed in a highly responsive manner and with modest power input. Two example embodiments of different systems or apparatuses suitable for usage as torque smoothing apparatus 22 will now be described. The first example embodiment of the torque smoothing apparatus is described in conjunction with FIGS. 3-7, while the second example embodiment of the torque smoothing apparatus is described in conjunction with FIGS. 8-10.

Figure 3:
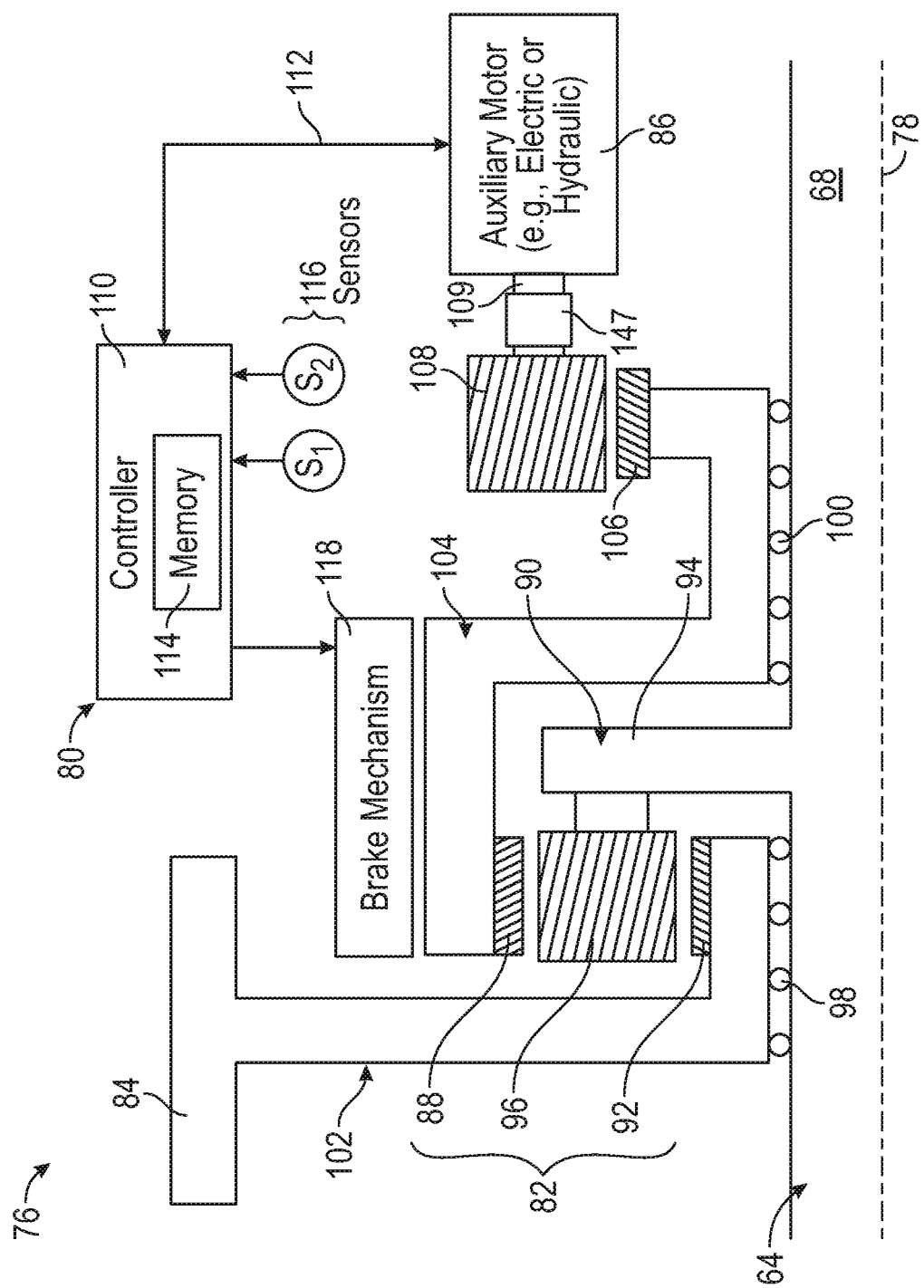
FIG. 3 is a cross-sectional schematic illustrating a planetary gear train, a flywheel, and a control system contained in the torque smoothing apparatus in a first example embodiment.

Referring now to FIG. 3, an example embodiment of a torque smoothing apparatus 76 is schematically presented. The example torque smoothing apparatus 76 is suitable for usage as the torque smoothing apparatus 22 schematically shown in FIGS. 1-2. The torque smoothing apparatus 76 includes a control system 80, an epicyclic or planetary gear train 82, a flywheel 84, and an auxiliary motor 86. The planetary gear train 82 and the flywheel 84 are mounted about the LSB drive line 64 for rotation about a common rotational axis 78. While only partially shown in FIG. 3, it will be appreciated that the components of the planetary gear train 82 and the flywheel 84 are generally axisymmetric about the rotational axis 78 of the LSB drive line 64. In the example embodiment of FIG. 3, the torque smoothing apparatus 76 is mounted around a single shaft 68 included in the LSB drive line 64 and, therefore, may be described as having a "solid shaft" or "through-shaft" design. In further implementations, the torque smoothing apparatus 76 may be mounted about two or more coaxial shafts included in the LSB drive line 64, as further discussed below in connection with FIG. 8.

The planetary gear train 82 of the torque smoothing apparatus 76 includes a ring gear 88, a planet-carrier assembly 90, and a sun gear 92. The planet-carrier assembly 90 includes, in turn, a carrier 94 supporting a number of (e.g., three) planet gears 96, one of which can be seen in FIG. 3. The planet gears 96 are positioned in mesh engagement between the toothed inner periphery of the ring gear 88 and the toothed outer periphery of the sun gear 92. The planet-carrier assembly 90, the ring gear 88, and the sun gear 92 are arranged for coaxial rotation about the rotational axis 78 of the shaft 68 contained in the LSB drive line 64. The sun gear 92 of the planetary gear train 82 is supported by one or more rolling element bearings 98 (e.g., ball or roller bearings) disposed about the shaft 68 on a first side of the carrier 94. Similarly, the ring gear 88 is similarly supported by rolling element bearings 100 (e.g., ball or roller bearings) further disposed about the shaft 68 on a second, opposing side of the carrier 94.

The flywheel 84 is mechanically coupled to the sun gear 92 in a fixed rotational relationship. In the illustrated example, the flywheel 84 and the sun gear 92 are mechanically coupled in a 1:1 rotational relationship and may be coupled by a solid connection. More specifically, and as indicated on the left of FIG. 3, the flywheel 84 and the sun gear 92 may be combined a flywheel-sun gear structure 102. The flywheel-sun gear structure 102 can be fabricated as a single or monolithic piece in embodiments to minimize part count and reduce complexity. In other implementations, the flywheel 84 and the sun gear 92 may be fabricated as discrete components, which are then connected or otherwise placed in a rotationally-fixed relationship when assembling torque smoothing apparatus 76. Similarly, in embodiments, the carrier 94 of the planet-carrier assembly 90 may be integrally formed with the shaft 68; or, instead, otherwise joined or mounted to the shaft 68 in a fixed rotational relationship, such as through a splined or curvic interface.

In the embodiment of FIG. 3, the ring gear 88 forms part of a larger ring gear-input gear structure 104. The ring gear-input gear structure 104 further includes an input gear 106, which engages a pinion 108 fixedly coupled to a motor output 109 (e.g., an output shaft) of the auxiliary motor 86. By virtue of this arrangement, the auxiliary motor 86 is controllable to selectively apply torque input into the ring gear-input gear structure 104.

The auxiliary motor 86 may apply torque to planetary gear train 82 through the ring gear 88 when so commanded by a controller 110 further included in the control system 80 (described below). In a manner similar to the flywheel-sun gear structure 102, the ring gear-input gear structure 104 may be fabricated as a single piece or monolithic structure in embodiments. Alternatively, the ring gear 88 and input gear 106 may be separately fabricated and secured in a fixed rotational relationship when assembling the torque smoothing apparatus 76.

The auxiliary motor 86 can be any device suitable for driving rotation of a component or gear member included in the gear train 82 (in the present example, by driving rotation of the ring gear 88). The auxiliary motor 86 also regulates slippage of the ring gear 88; and, therefore, prevents or at least deters the undesired rotation of the ring gear 88 during operation of the torque smoothing apparatus 76. In this regard, the auxiliary motor 86 may assume the form of an electric or hydraulic motor, which operates in response to commands signals from a controller 110 further included in the control system 80. In embodiments in which the auxiliary motor 86 is a hydraulic motor, various other standardized components (e.g., valves, pumps, flow circuits, etc.) may be coupled between controller 110 and the auxiliary motor 86 (not shown in FIG. 3 for clarity). The connection between the controller 110 and the auxiliary motor 86 is represented in FIG. 3 by arrow 112 and may be a hardline connection or a wireless connection. In some embodiments, the auxiliary motor 86 may provide feedback to the controller 110 indicative of the operating parameters (e.g., torque output or the rotational speed) of motor output 109, which the controller 110 may then consider when executing the below-described control functions.

The controller 110 of the torque smoothing apparatus 76 can assume any form suitable for performing the functions described throughout this document. Further, the term "controller," as appearing herein, is utilized in a non-limiting sense to generally refer to the processing architecture of the torque smoothing apparatus 76. The controller 110 can encompass or may be associated with one or more processors, control computers, computer-readable memories, power supplies, storage devices, interface cards, and other standardized components. The controller 110 may also include or cooperate with any number of firmware and software programs or computer-readable instructions designed to carry-out the various process tasks, calculations, and control functions described herein. Such computer-readable instructions may be stored within a memory 114 accessible to the controller 110. While generically illustrated in FIG. 3 as a single block, the memory 114 can encompass any number and type of storage media suitable for storing computer-readable code or instructions, as well as other data utilized to support the operation of the torque smoothing apparatus 76. The memory 114 may be integrated into the controller 110 in embodiments as, for example, a system-in-package, a system-on-a-chip, or another type of micro-electronic package or module. Finally, while the components of the torque smoothing apparatus 76 may be entirely located onboard the LSB 20, this need not be the case in all embodiments. For example, in certain embodiments, the controller 110 and, perhaps, one or more of the below-described sensors 116 may be located onboard the tractor to which the LSB 20 is connected.

The control system 80 may include one or more sensors 116, which provide signal input to the auxiliary motor 86 (in addition to or in lieu of signal feedback provided by the auxiliary motor 86 itself). In the illustrated embodiment, two such sensors 116 are generically shown and labeled as "$S_1$" and "$S_2$." When included in the torque smoothing apparatus 76, the sensors 116 can provide sensor input to the controller 110 indicative of different operating parameters of the torque smoothing apparatus 76 and, more broadly, the LSB 20. Specifically, in at least some implementations, the controller 110 may utilize sensor data to monitor plunger position (that is, translational position of the plunger 58 within the bale chamber 40 shown in FIG. 2) when controlling the auxiliary motor 86. Plunger position may be monitored directly, inferred from the position of a component mechanically coupled to the plunger 58 in a fixed relationship (e.g., by monitoring the rotational position of the plunger crank mechanism 60), or inferred from loading conditions. Thus, in such embodiments, the controller 110 may estimate plunger position during bale formation utilizing such sensor data and then control the rotational speed of the motor output 109 based, at least in part, on estimated plunger position. One manner in which the controller 110 may control the speed of motor output 109 is set-forth in FIG. 6, as described below. In other instances, the controller 110 may consider other types of sensor data in implementing an established control scheme, such as data indicative of the rotational speed of the LSB drive line 64 and/or indicative of torque or speed of the auxiliary motor 86. Further, in embodiments in which the control system 80 includes a brake mechanism (e.g., the below-described brake mechanism 118) engaged during startup and/or shutdown of the torque smoothing apparatus 76, the sensors 116 may further provide data indicative of the operational status of the LSB 20.

In certain embodiments, a clutch can be integrated into the torque smoothing apparatus 76 to the auxiliary motor 86 against overspeed conditions. An example of such a clutch 147, such as a centrifugal clutch, is further schematically shown in FIG. 3. The clutch 147 is mechanically coupled between the flywheel 84 and the auxiliary motor 86, and is configured to disengage the motor output 109 from the flywheel 84 when the rotational speed across the clutch exceeds a predetermined threshold. Additionally or alternatively, a brake mechanism 118 may also be included in the torque smoothing apparatus 76. When present, the brake mechanism 118 may be selectively engaged against an outer periphery of the ring gear-input gear structure 104 by the controller 110 to slow or arrest the rotation of the structure 104. Specifically, the brake mechanism 118 may be engaged to deter rotation of the ring gear 88 to facilitate spin-up of the flywheel 84 to a desired rotational speed upon start-up of the LSB 20. Additionally or alternatively, the braking of the ring gear 88 can be utilized to slow (and thereby dissipate the kinetic energy stored by) the spinning flywheel upon LSB shutdown. Thus, in such embodiments, the controller 110 may monitor the operational status of the LSB 20 and engage the brake mechanism to deter rotation of the ring gear 88 upon startup and/or shutdown of the LSB 20.

Figure 4:
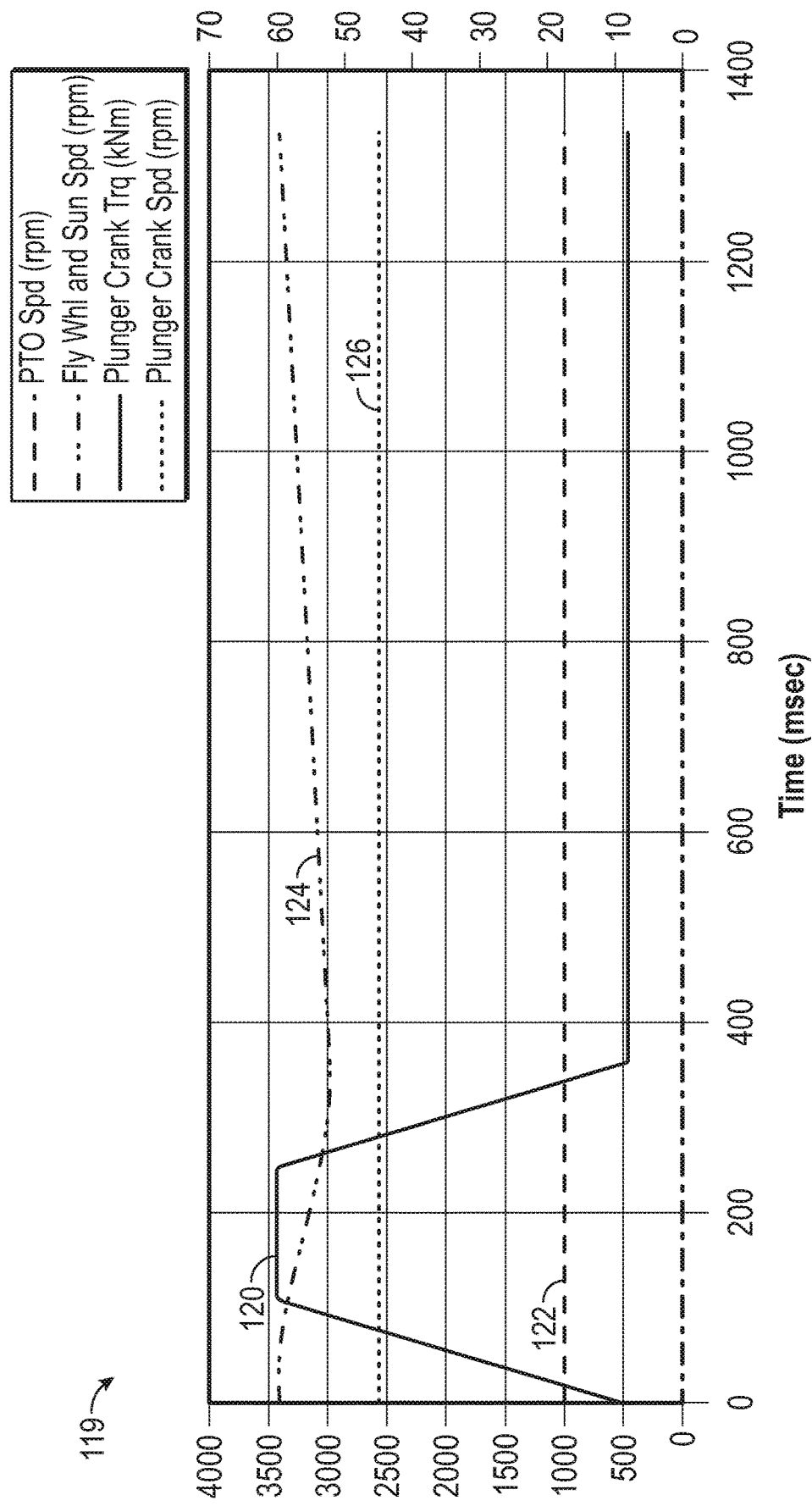
FIGS. 4-7 graphically express selected performance parameters of the example torque smoothing apparatus shown in FIG. 3.

Example operational parameters of the torque smoothing apparatus 76 will now be discussed with reference to graphs 119, 121, 123, 125 set-out in FIGS. 4, 5, 6, and 7, respectively. In each of the graphs 119, 121, 123, 125, time is plotted along the horizontal axis (abscissa) for a duration of 0 ms to approximately 1333 ms. In keeping with the previously-introduced example, this corresponds to the time period required for the plunger 58 to complete one stroke in an example implementation in which the plunger 58 reciprocates at 45 strokes per minute. Further, in each of the illustrated graphs 119, 121, 123, 125, the high torque demand compression phase of the plunger stroke occurs between approximately 0 ms and 350 ms. This may be appreciated by referring to plunger crank torque plotted in the graph 119 by a trace 120 (FIG. 4). The plunger crank torque (trace 120) is expressed in kNm and corresponds to the vertical axis scale shown on the left of the graph 119. As can be seen, the relatively steep increase in the plunger crank torque (trace 120, peaking at about 3500 kNm) corresponds to the compression phase of the plunger stroke occurring between about 0 and about 350 ms. After this time period, the plunger crank torque (trace 120) decreases at a rapid rate until returning to a minimal value of approximately 500 kNm at around 380 ms. The plunger crank torque (trace 120) then remains substantially constant for the remainder of the plunger stroke (from about 380 ms to about 1400 ms in the illustrated example) until the plunger stroke cycle repeats.

It may further be seen in the graph 119 (FIG. 4) that, despite the pronounced variance in plunger torque demand, the PTO speed (trace 122) and, therefore, the load placed on the tractor engine (as contributed by the LSB 20, specifically) is held substantially constant over the plunger stroke cycle. In the graph 119, the PTO speed (trace 122) is expressed in RPM and is maintained at approximately 1000 RPM over the plunger stroke (again, referencing the left vertical scale in FIG. 4). Correspondingly, the plunger crank speed (trace 126) likewise remains substantially constant at approximately 45 RPMs, as indicated on the right vertical scale of the graph 119. The difference between the plunger crank speed (trace 126) and the PTO speed (trace 122) is due to a fixed gear reduction provided by the gearbox 62, here a reduction of 22.2. Thus, in such embodiments, the controller 110 controls the auxiliary motor 86 (and specifically regulates the speed of the motor output 109) to maintain the PTO shaft and the LSB drive line 64 at a substantially constant rotational speed during bale formation by the LSB 20. As appearing herein, a named value (e.g., the rotational speed of the PTO shaft) is considered "substantially constant" when differing by less than 5% over the plunger stroke cycle. In other embodiments, the controller 110 may regulate the speed of the auxiliary motor 86 such that the rotational speed of the LSB drive line 64 and the rotational speed of the non-illustrated PTO shaft varies by less than 10% over the plunger stroke cycle of the LSB 20.

To achieve this consistency in the plunger crank speed (trace 126) and the PTO speed (trace 122), the flywheel 84 (and to a lesser extent the auxiliary motor 86) provides a positive torque contribution compensating for the steep increase in torque demand over the compression phase of the plunger stroke. This may be further appreciated by referencing the flywheel speed plotted by the trace 124 in FIG. 4, while observing the gradual decrease in flywheel speed (indicating a positive torque contribution) corresponding to the increased demand in plunger crank torque (trace 120) occurring between approximately 0 and 350 ms. Afterwards, at approximately 350 ms, the flywheel speed gradually increases (reaching a maximum speed of approximately 3500 RPM) as additional kinetic energy is stored within the flywheel 84. The flywheel 84 consequently provides a negative torque contribution over the remainder of the plunger cycle occurring after of the high torque demand compression phase. Stated differently, the PTO power accelerates and stores energy in the flywheel 84 when the plunger power is lower than the average plunger cycle power; and, conversely, the plunger load decelerates and removes energy from the flywheel 84 when the plunger power is higher than the average plunger cycle power.

Figure 5:
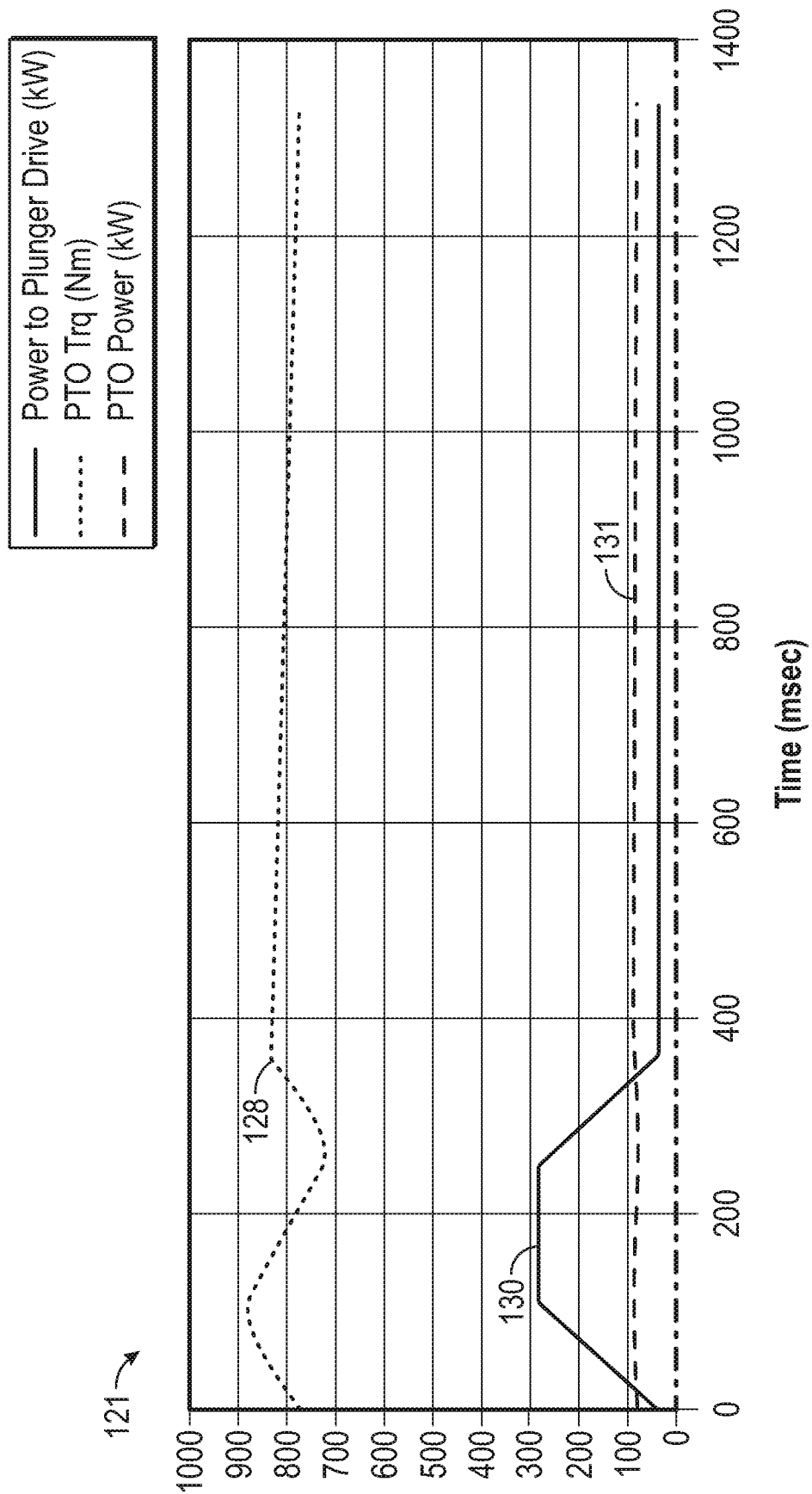

Referring now to the graph 121 shown in FIG. 5, the variance in PTO torque over the plunger stroke is further plotted by a trace 128. In the illustrated example, the PTO torque varies from a maximum value of approximately 880 Nm to a minimum value of approximately 710 Nm. Thus, while some variance in the PTO torque occurs over the compression phase of the plunger stroke (again, between about 0 and about 350 ms), such PTO torque variance is minimized relative to that seen in conventional torque smoothing apparatuses containing relatively massive, high inertia flywheels. Further, the power to the plunger drive 64 (trace 130, expressed in kilowatts (kW)) increases over a duration corresponding to the increased demand in plunger crank torque (trace 120, FIG. 4). Specifically, the power to the plunger drive 64 (trace 130) increases to a peak of approximately 300 kW during the compression phase before declining to approximately 50 kW for the remainder of the plunger stroke. Concurrently, and as indicated by a trace 131 (expressed in kW) plotted in the graph 121 shown in FIG. 5, the PTO power remains substantially constant over the plunger stroke; e.g., the PTO power remains at approximately 100 kW over the plunger stroke cycle.

Figure 6:
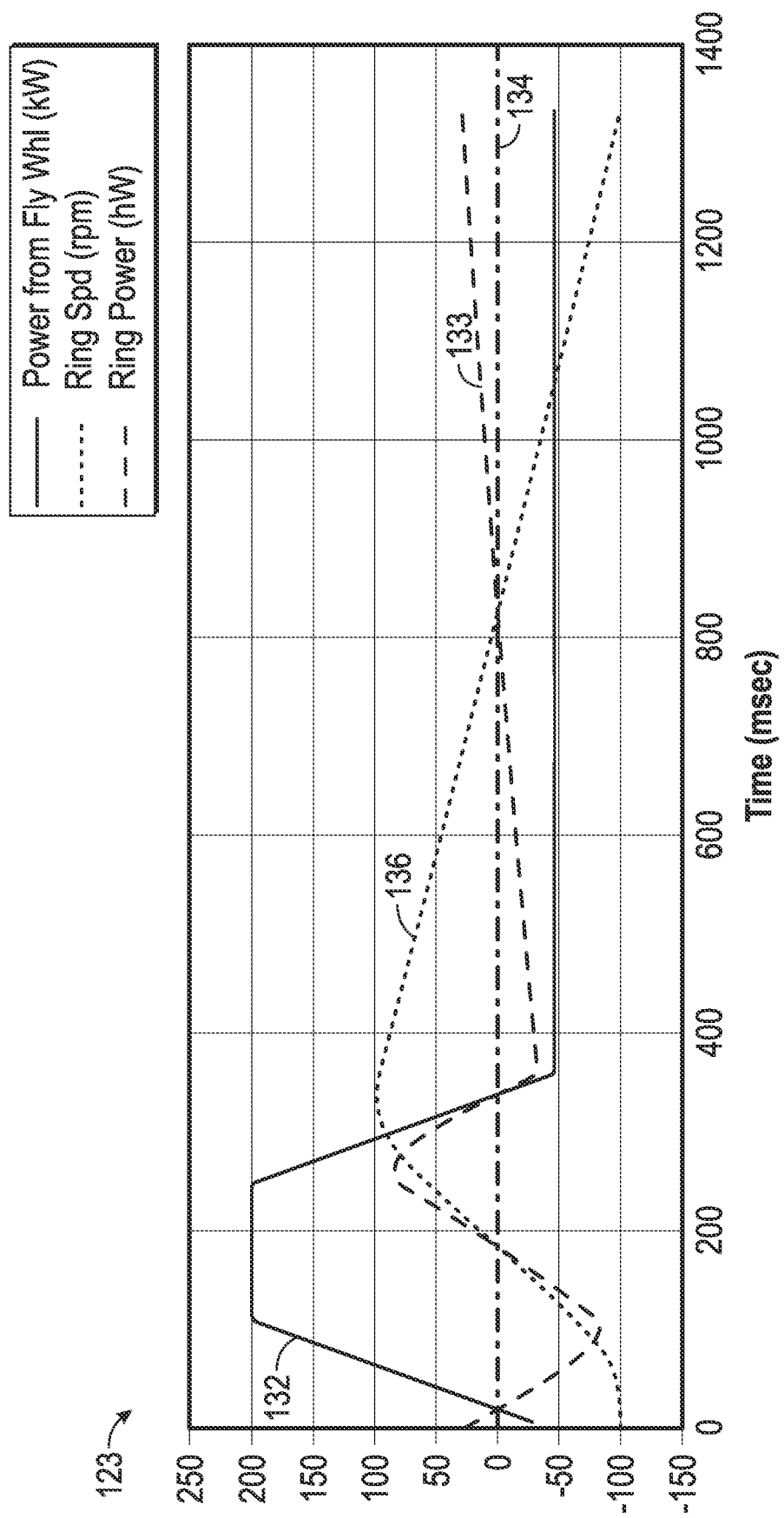

The manner in which the flywheel 84 vacillates between positive and negative energy (torque) contributions to reduce variance in torque requirements placed on the PTO shaft and the LSB drive line 64 may be further appreciated by referring to the graph 123 (FIG. 6). As indicated in the graph 123, the power or torque contribution from the flywheel 84 is initially positive, as indicated by the portion of trace 132 above dotted zero line 134, peaking at approximately 200 kW. This again demonstrates the manner in which the flywheel 84 slows to provide a positive torque contribution to drive plunger movement during the compression phrase of the plunger stroke. Conversely, after the compression phase, at approximately 350 ms, the torque contribution from the flywheel 84 drops below the zero line 134 to a value of approximately −50 kW. This indicates a negative contribution (debit) from the flywheel 84 as the flywheel 84 now begins to capture and store kinetic energy for usage in the next cycle.

The ring speed and rotational direction (as indicated by the positioning of the trace 136 relative to the zero line 134) varies in conjunction with the torque input or output from the flywheel 84. Notably, the trace 136 indicates one manner in which the controller 110 may regulate the rotational speed of the motor output 109 (and, therefore, the rotational speed of the ring gear 88) to maintain a substantially constant PTO speed (trace 122) and a substantially constant plunger crank speed (trace 126) during operation of the LSB 20. Again, the controller 110 may determine the appropriate adjustments in the rotational speed of the ring gear 88 utilizing sensor data received from the sensors 116 (FIG. 3) indicative of plunger position, loading conditions, or other such operation parameter of the LSB 20. The controller 110 controls the motor output 109 of the auxiliary motor 86 such that the rotational direction of the ring gear 88 initially reverses (transitions from a rotation in a first rotational direction to rotate in a second, opposing rotational direction) during the plunger stroke compression phase; and then reverses a second time (returning to rotation in the first rotational direction) at a predetermined juncture following the compression phase (around 850 ms in the illustrated example). In other implementations, the ring gear 88 may not reverse its direction of rotation during operation of the torque smoothing apparatus 76; however, permitting reverse motion of the ring gear 88 may enable the power requirements of the auxiliary motor 86 to be reduced and is thus permitted in at least some embodiments of the torque smoothing apparatus 76.

The power applied by the auxiliary motor 86 to the ring gear 88 is plotted in the graph 123 as a trace 133 (expressed in hectowatt (hW) units). As appearing in the graph 123, the units of the ring power (trace 133, expressed in hW) differ relative to the units of the flywheel power contribution (trace 132, expressed in kW) by a factor of 10. This is done to more clearly illustrate the variance in the ring power (the power applied to the ring gear 88 by the auxiliary motor 86) over the compression stroke of the plunger 58 occurring from approximately 0 ms to 350 ms. Additionally, as can be seen, the auxiliary motor 86 need only provide a relatively modest torque input in the illustrated example, thereby allowing the size and cost of the motor 86 to be minimized.

Figure 7:
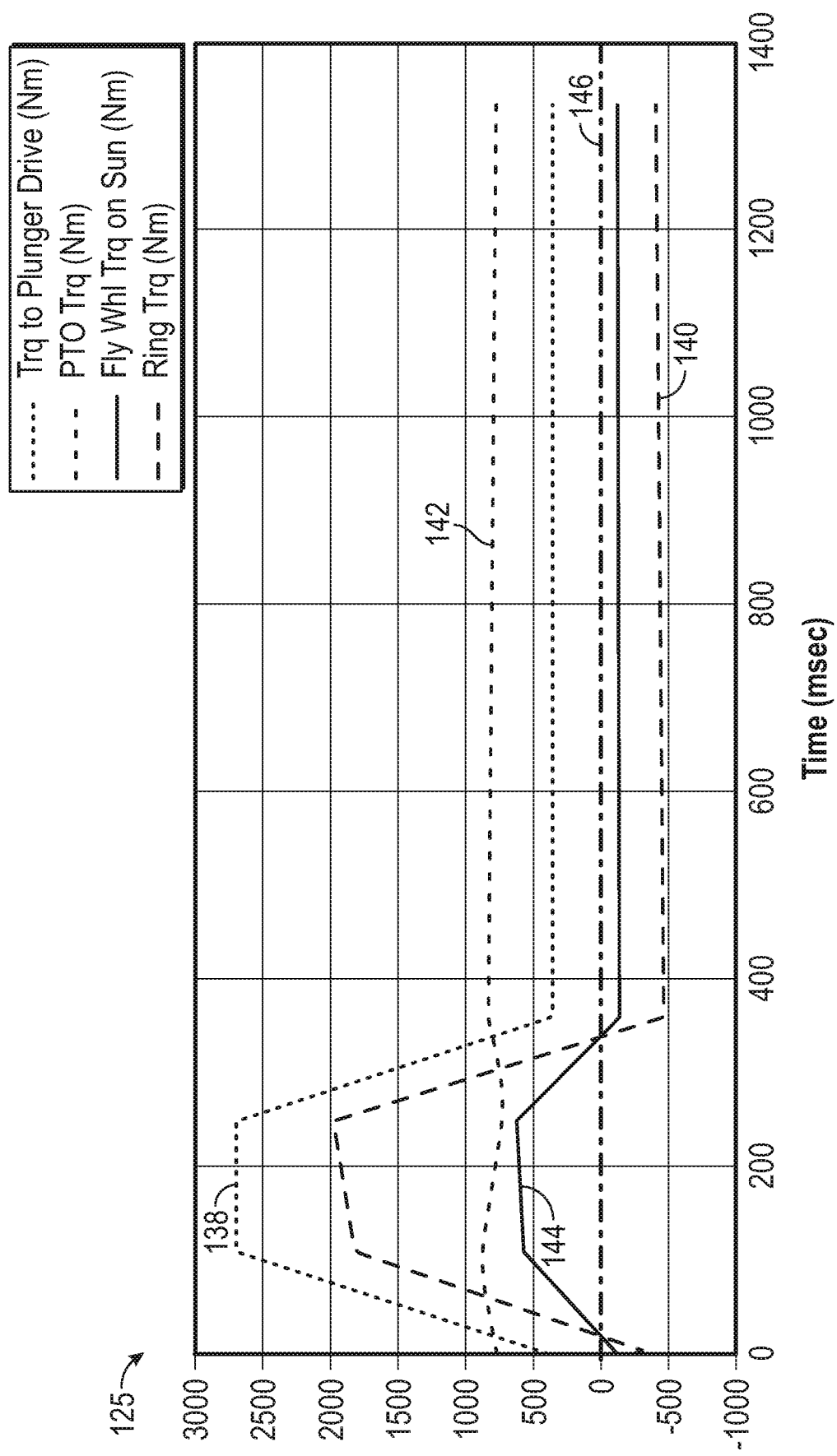

Lastly, with reference to the graph 125 shown in FIG. 7, several torque comparisons are presented. This includes the torque applied to the plunger drive 54 (trace 138), the torque applied to the ring gear (trace 140 PTO torque (trace 142), and the torque contribution of the flywheel 84 (trace 144). The illustrated traces (traces 138, 140, 142, 144) are each expressed in Nm in the graph 125. Once again, the torque applied to the plunger drive 54 (trace 138) spikes over the compression phase of the plunger stroke as does the ring torque (trace 140) and the flywheel torque applied to the sun gear 92 (trace 144). In comparison, PTO torque (trace 142) remains substantially constant. The negative torque contribution of the flywheel 84 (trace 144) occurring during this phase of the plunger stroke is represented by the portions of the trace 144 below the zero line 146.

In the above-described manner, the controller 110 of the torque smoothing apparatus 76 is configured to command the auxiliary motor 86 to selectively apply torque to the LSB drive line 64 such that the torque applied by the auxiliary motor 86, taken in combination with the (positive or negative) torque contribution of the flywheel 84, reduces variations in torque demands placed on the vehicle engine as the plunger 58 reciprocates within the bale chamber 40 to form a crop bale, such as the crop bale 56 shown in FIG. 2. The variation in torque demands or loading placed on the vehicle engine is reduced as compared to the torque demands that would otherwise be placed on the vehicle engine by the LSB 20 during bale formation if the LSB 20 lacked the torque smoothing apparatus 76. In alternative embodiments, the torque smoothing apparatus can assume various other forms, while still providing such a reduction in the torque demands placed on the vehicle engine during LSB operation. Further emphasizing this point, a second example embodiment of a torque smoothing apparatus also suitable for usage as the torque smoothing apparatus 22 generically shown in FIG. 2 will now be described in connection with FIGS. 8-10.

Figure 8:
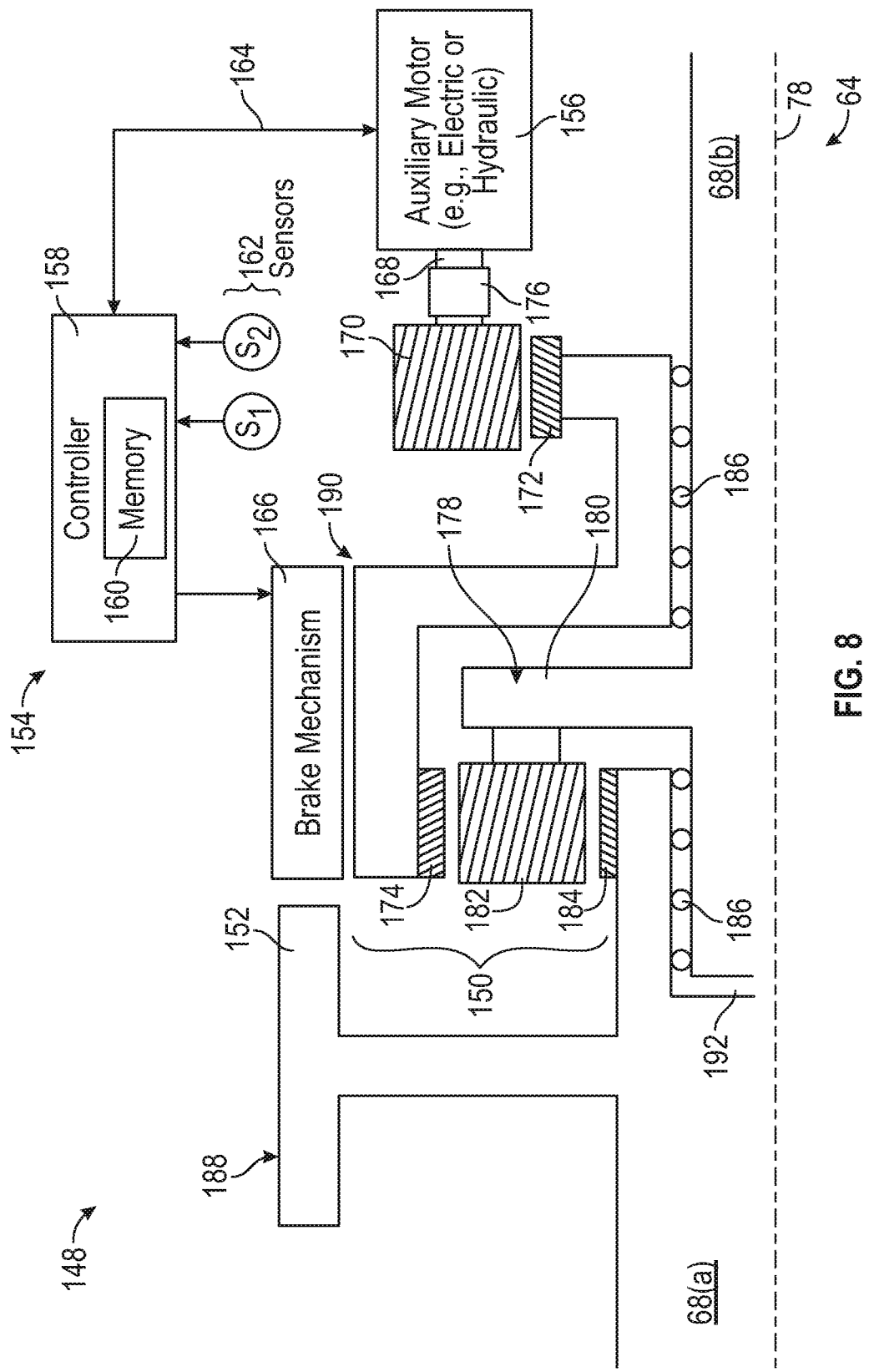
FIG. 8 is a cross-sectional schematic illustrating various components contained in the torque smoothing apparatus in a second example embodiment.

Referring now to FIG. 8, a second example torque smoothing apparatus 148 is schematically presented. In many respects, the torque smoothing apparatus 148 is similar to the torque smoothing apparatus 76 described above in connection with FIGS. 3-7. For example, the torque smoothing apparatus 148 includes a planetary gear train 150, a flywheel 152, controller 154, and an auxiliary motor 156, such as a hydraulic or electric motor. The controller 154 is associated with a memory 160 containing computer-readable instructions specifying the control scheme implemented by the controller 154 when controlling the auxiliary motor 156. The controller 158 may receive sensor input data from any number of sensors 162, utilizing such sensor input to determine a desired output of the auxiliary motor 156, and then transmit corresponding command signals to the auxiliary motor 156 over a connection 164 to implement the desired motor output. The controller 158 may also control a brake mechanism 166, which may be selectively engaged to deter the rotational of a ring gear 174 included in the planetary gear train 150 during LSB startup and/or shutdown, as previously described.

During operation of the torque smoothing apparatus 148, the controller 158 may command the motor 156 to rotate a motor output 168 and a pinion 170. Rotation of the pinion 170 drives rotation of an input gear 172, which is rotationally-fixed to a ring gear 174 included in the planetary gear train 150. Once again, a clutch 176 may be provided at the motor output 168 to prevent overspeed of the motor 156 in a manner analogous to that described above. In addition to the ring gear 174, the planetary gear train 150 further includes a planet-carrier assembly 178 having a carrier 180 to which a plurality of planet gears 182 are mounted. A sun gear 184 is engaged along its toothed outer periphery by the planet gears 182, which are engaged by the toothed inner periphery of the ring gear 174. Finally, as was previously the case, bearings 186 (e.g., ball or roller bearings) may be provided to support the rotating components of the planetary gear train 150, as shown. The sun gear 184 and the flywheel 152 may be produced as a single piece or monolithic part (herein, a "flywheel-sun gear structure 188") in embodiments. In other instances, the sun gear 184 and the flywheel 152 may be realized as separate components and placed in a rotationally-fixed relationship when the torque smoothing apparatus 148 is assembled. So too are the ring gear 174 and the input gear 172 conveniently, although non-essentially formed as a single piece or monolithic part (herein "ring gear-input gear structure 190") in embodiments.

In contrast to the torque smoothing apparatus 76 described above in connection with FIG. 3, the torque smoothing apparatus 148 (FIG. 8) lacks a through-shaft or solid shaft configuration. Rather, two separate shafts 68(*a*), 68(*b*) are positioned in a coaxial relationship for rotation about the axis 78, while separated by an axial offset or gap 192. In FIG. 8, the output shaft (leading to the LSB plunger 58) is identified by reference numeral "68(*a*)," while the input shaft is identified by reference numeral "68(*b*)." The torque smoothing apparatus 148, and specifically the planetary gear train 150, is mounted across the two shafts 68(*a*), 68(*b*) and spans (extends axially across) the axial gap 192. During operation, torque is applied to input shaft 68(*b*) through the PTO shaft to turn the carrier 180 about the rotational axis 78 at a relatively rapid rotational speed. Comparatively, the output 168 of the auxiliary motor 156 may remain stationary or turn at a relatively slow rate of rotation, depending upon the command signals received from the controller 158. This induces rotation of the sun gear 184 and, therefore, the flywheel 152 to provide the desired energy storage function. Thus, once again, the motor 156 needs only provide a relatively small torque contribution and can be sized accordingly. The controller 158 commands the auxiliary motor 156 to rotate the motor output 158 and input a positive torque contribution into the LSB drive line 64 through the planetary gear train 150, as described below in connection with FIGS. 9 and 10.

Figure 9:
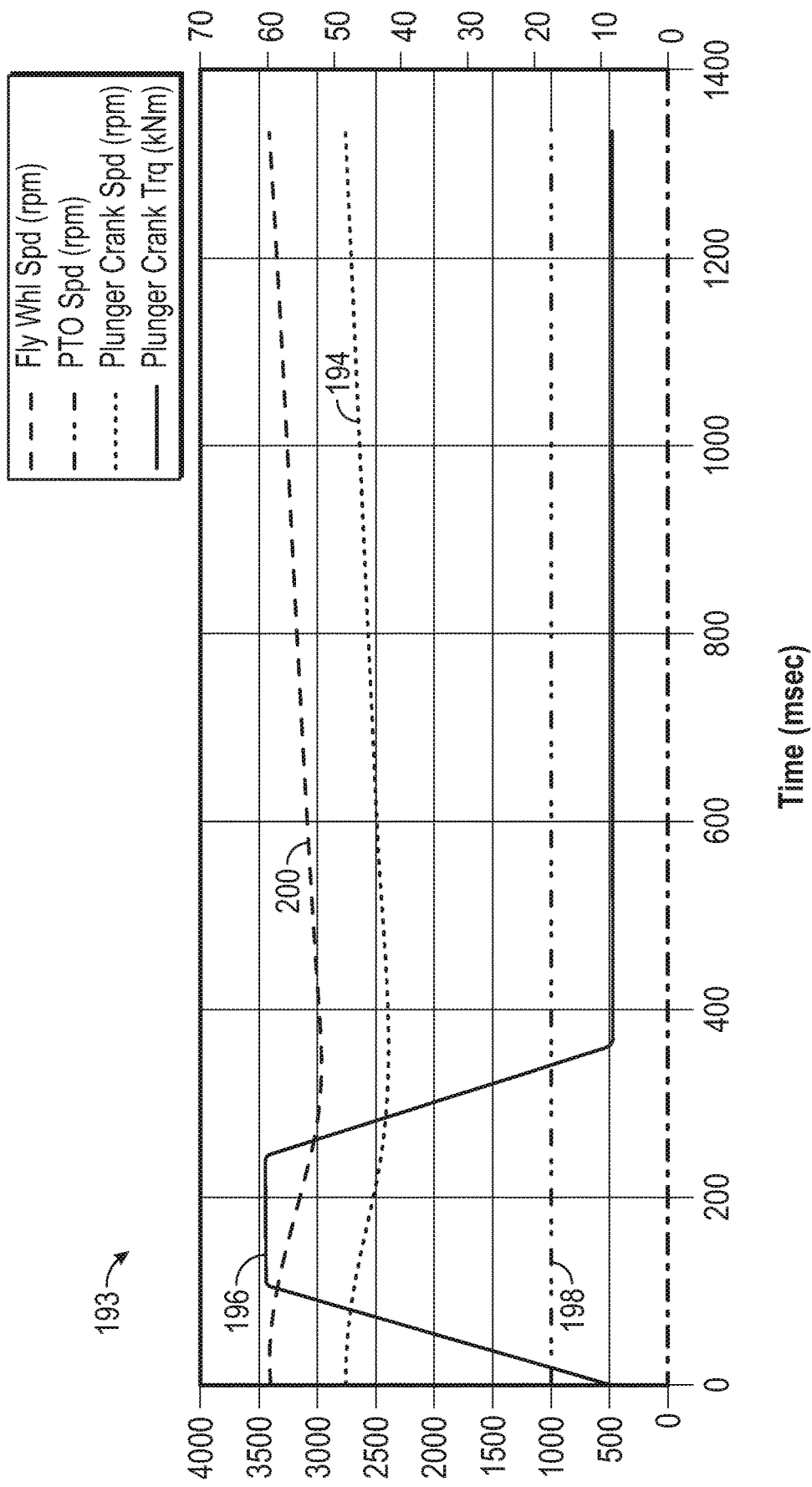
FIGS. 9 and 10 graphically set-forth performance parameters of the example torque smoothing apparatus shown in FIG. 8.
Figure 10:
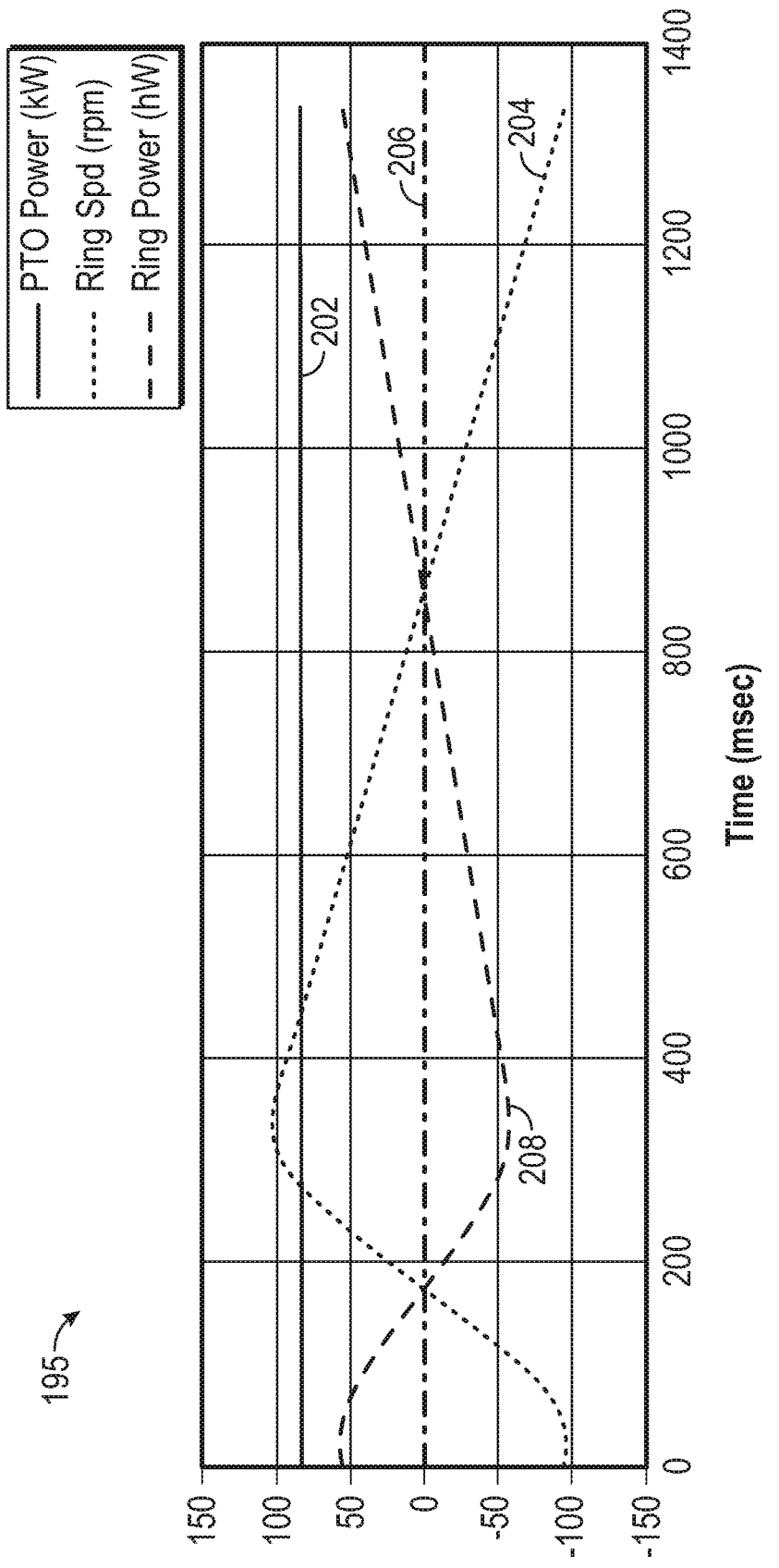

Turning now to FIGS. 9 and 10, the plunger crank speed may vary during the plunger stroke cycle as indicated by a trace 194 in graph 193 (FIG. 9). More specifically, the plunger crank speed (trace 194) ranges from approximately 41 to 50 RPM (indicated on the right vertical scale in FIG. 9) during operation of the example torque smoothing apparatus 148 (FIG. 8). Referring to the left vertical scale of the graph 193, the plunger crank torque (trace 196, expressed in kNm) experiences a temporary spike during the compression phase of the plunger stroke (from about 0 ms to about 350 ms), with the plunger crank torque again reaching a peak value of approximately 60 kNm in the illustrated example. After peaking during the compression phase of the plunger stroke, the plunger crank torque (trace 196) then rapidly decreases to a relatively low value (e.g., >10 kNm) and remains substantially constant until the next iteration of the compression phase of the plunger stroke cycle.

As was previously the case with the controller 110 of the torque smoothing apparatus 76, the controller 158 may regulate the speed of the motor 156 in a manner maintaining rotation of the input shaft 68(*b*) of the LSB drive line 64 and, therefore, the PTO shaft of the tractor at a substantially constant speed. This is indicated in the graph 193 (FIG. 9) by a trace 198. As indicated by the trace 198, PTO speed is maintained at a substantially constant (e.g., around 1000 RPM) over the plunger stroke cycle. Finally, as indicated by the trace 200 in the graph 193 (FIG. 9), the flywheel speed decreases and increases in relation to the changes in the demand of the plunger crank torque to contribute positive or negative torque, as needed, to maintain rotation of the input shaft 68(*b*) and the PTO shaft at a substantially constant speeds. In particular, the flywheel speed (trace 200) slows to supply additional power (positive torque contribution) to the LSB drive line 64 through the planetary gear train 150 during the plunger stroke compression phase. Conversely, after the compression phase, the flywheel speed (trace 200) gradually increases as the flywheel 188 gradually stores kinetic energy (thereby providing a negative torque contribution) for release during the compression phase of the next plunger stroke.

Referring now to the graph 195 in FIG. 10, PTO power is plotted by a trace 202 (expressed in kW) and remains constant over the duration of the plunger stroke cycle. Comparatively, ring speed is plotted by a trace 204 (expressed in RPM), with changes in the rotational direction of the ring gear 174 indicated by the relative position of different segments of the trace 204 above or below a dashed zero line 206. As can be seen, the controller 158 regulates the output of the auxiliary motor 156 such that the direction in which the ring gear 174 rotates reverse during the plunger stroke compression phase and again at a predetermined juncture following the compression phase (e.g., around 850 ms). Finally, ring power is further plotted in the graph 195 (FIG. 10) by a trace 208. Once again, ring power (trace 208) is plotted in hW (as opposed to kW) indicating the relatively modest power contribution required from the auxiliary motor 156 in carrying-out the above-described control scheme to maintain substantially constant PTO speed and engine loading during operation of the LSB 20.

Thus, in a manner akin to the controller 110 of the torque smoothing apparatus 76 (FIG. 3), the controller 158 of the torque smoothing apparatus 148 controls the auxiliary motor 156 to selectively apply torque to the LSB drive line 64 such that the torque applied by the auxiliary motor 156, taken in combination with the (positive or negative) torque contribution of the flywheel 152, reduces variations in torque demands placed on the vehicle engine as the plunger 58 reciprocates within the bale chamber 40 to form a crop bale. Additionally, in various embodiments, the controller 158 may regulate the output speed of the auxiliary motor 156 in a manner ensuring that the rotational speed of the LSB drive line 64 and the rotational speed of the non-illustrated PTO shaft varies by less than 10% during the plunger stroke cycle and, perhaps, is maintained at a substantially constant value during the plunger stroke cycle.

Enumerated Examples of the Torque Smoothing Apparatus

The following examples of the torque smoothing apparatus are further provided and numbered for ease of reference.

1. A torque smoothing apparatus utilized in conjunction with an LSB are provided. The LSB is attachable to a work vehicle containing a vehicle engine. The LSB includes a bale chamber, a plunger mounted for reciprocation within the bale chamber, and an LSB drive line rotationally driven by the vehicle engine when the LSB is attached to the work vehicle. In various embodiments, the torque smoothing apparatus includes a planetary gear train and a flywheel, which is mechanically coupled to the LSB drive line through the planetary gear train. An auxiliary motor has a motor output, which is further mechanically coupled to the LSB drive line through the planetary gear train. A controller is operably coupled to the auxiliary motor. The controller is configured to command the auxiliary motor to selectively apply torque to the LSB drive line such that the torque applied by the auxiliary motor, taken in combination with a torque contribution of the flywheel, reduces variations in torque demands placed on the vehicle engine as the plunger reciprocates within the bale chamber to form a crop bale.

2. The torque smoothing apparatus of example 1, wherein the work vehicle further contains a PTO shaft mechanically linked between the vehicle engine and the LSB drive line. The controller is configured to control the auxiliary motor to maintain the PTO shaft at a substantially constant rotational speed during bale formation by the LSB.

3. The torque smoothing apparatus of example 1, wherein the planetary gear train includes: a ring gear mechanically coupled to the output of the auxiliary motor in a fixed rotational relationship; a planet-carrier assembly including a carrier and a plurality of planet gears, the plurality of planet gears supported by the carrier and engaging a toothed inner periphery of the ring gear; and a sun gear coaxial with the ring gear and the carrier assembly, the sun gear engaging the plurality of planet gears.

4. The torque smoothing apparatus of example 3, wherein the flywheel is mechanically coupled to the LSB drive line through the sun gear and through the planet-carrier assembly.

5. The torque smoothing apparatus of example 4, wherein the flywheel is rotationally fixed to the sun gear.

6. The torque smoothing apparatus of example 3, wherein the LSB drive line includes a drive line shaft around which the planet-carrier assembly is disposed. The carrier is rotationally fixed to the drive line shaft.

7. The torque smoothing apparatus of example 3, wherein the auxiliary motor is mechanically coupled to LSB drive line through the ring gear.

8. The torque smoothing apparatus of example 3, wherein the controller commands the auxiliary motor in manner causing a rotational direction of the ring gear to reverse during a plunger stroke compression phase of the plunger.

9. The torque smoothing apparatus of example 1, further comprising a sensor providing sensor data indicative of PTO speed or PTO torque of a PTO shaft mechanically linked between the vehicle engine and the LSB drive line. The controller is coupled to the sensor and is configured to adjust motor speed to reduce variations in the PTO speed or torque during operation of the torque smoothing apparatus.

10. The torque smoothing apparatus of example 1, wherein the LSB further contains a plunger crankshaft connected to the plunger, while the torque smoothing apparatus further includes a plunger crankshaft speed sensor configured to monitor a speed of the plunger crankshaft. The controller is coupled to the plunger crankshaft speed sensor and is further configured to regulate a rotational speed of the motor output to maintain a substantially constant plunger crankshaft speed during operation of the torque smoothing apparatus.

11. The torque smoothing apparatus of example 1, further including a brake mechanism configured to deter rotation of the ring gear when the brake mechanism is engaged. The controller is operably coupled to the brake mechanism and is configured to engage the brake mechanism upon at least one of startup and shutdown of the LSB.

12. The torque smoothing apparatus of example 1, further including a clutch mechanically coupled between the flywheel and the auxiliary motor. The clutch disengages the motor output from the flywheel when the rotational speed across the clutch exceeds a predetermined threshold.

13. The torque smoothing apparatus of example 1, further including a sensor providing sensor data indicative of plunger position of the plunger within the bale chamber. The controller is coupled to the sensor and is configured to: (i) estimate plunger position utilizing the sensor data during bale formation by the LSB, and (ii) control a rotational speed of the motor output based, at least in part, on the estimated plunger position.

14. The torque smoothing apparatus of example 1, wherein the LSB drive line includes: an input shaft; an output shaft coaxial with the input shaft and mechanically coupled between the input shaft and the plunger contained in the LSB; and an axial gap separating the input shaft and the output shaft, the planetary gear train disposed in a coaxial relationship with the input shaft and with the output shaft, while spanning the axial gap.

15. The torque smoothing apparatus of example 14, wherein the flywheel is rotationally fixed to the output shaft.

CONCLUSION

There has thus been provided embodiments of a torque smoothing apparatus for usage in conjunction with LSBs. Embodiments of the torque smoothing apparatus utilize a unique combination of summing planetary gear train, flywheel, and auxiliary motor (electric or hydraulic) to produce an IVT for providing increased uniformity in torque demands placed on a tractor engine when driving the LSB through a PTO shaft during bale formation. Several benefits are achieved by improving the uniformity of torque demands (or "smoothing" variances in torque demands) placed on the tractor engine including, for example, reduction in engine wear and prolonged lifespan of engine components. Additionally, variances that may otherwise occur in tractor ground speed when torque an LSB during bale formation are minimized, if not eliminated, thereby improving operator experience. Flywheel lightening, complexity reductions (as compared to double-plunger systems), and other such benefits may be achieved in at least some implementations. Further, in certain embodiments, the torque smoothing apparatus may achieved substantially uniform plunger crank speed. Additionally or alternatively, embodiments of the torque smoothing apparatus may enable relatively simply control schemes when commanding an auxiliary motor to selectively apply torque to the flywheel, to the LSB drive line, or a combination thereof through the planetary gear train.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A torque smoothing apparatus utilized with a large square baler (LSB) including an LSB drive line attachable to a power takeoff (PTO) of a work vehicle, the LSB drive line connected to a plunger crank driving reciprocation of a plunger within a bale chamber, the torque smoothing apparatus comprising:
    a planetary gear train including a sun gear, a ring gear, and a planetary carrier, the ring gear supported on the LSB drive line via a bearing, and the planetary carrier directly connected to the LSB drive line in a 1:1 rotational relationship;
    a flywheel supported on the LSB drive line via a bearing, the flywheel directly connected to the sun gear in a 1:1 rotational relationship;
    an input gear directly connected to the ring gear in a 1:1 rotational relationship;
    an auxiliary motor directly engaging the input gear at a position radially inward of the ring gear; and
    a controller connected to the auxiliary motor, the controller, including a processor and memory having instructions, configured to command the auxiliary motor to reverse a first direction of rotation of the ring gear to an opposing second direction of rotation during a compression phase of the plunger and then reverse the second direction of rotation of the ring gear back to the first direction of the rotation after the compression phase which maintains a substantially constant speed of the LSB drive line and a substantially constant speed of the plunger crank.

2. The torque smoothing apparatus of claim 1, further comprising:
    a brake selectively engaged to deter rotation of the ring gear and to assist increasing rotational speed of the flywheel during start-up.

3. The torque smoothing apparatus of claim 1, wherein the controller is configured to command the auxiliary motor to maintain a substantially constant load on an engine of the work vehicle.

4. A large square baler (LSB), comprising:
    an LSB drive line attachable to a power takeoff (PTO) of a work vehicle;
    a plunger crank driving reciprocation of a plunger within a bale chamber;
    a planetary gear train including a sun gear, a ring gear, and a planetary carrier, the ring gear supported on the LSB drive line via a bearing, and the planetary carrier directly connected to the LSB drive line in a 1:1 rotational relationship;
    a flywheel supported on the LSB drive line via a bearing, the flywheel directly connected to the sun gear in a 1:1 rotational relationship;
    an input gear directly connected to the ring gear in a 1:1 rotational relationship;
    an auxiliary motor directly engaging the input gear at a position radially inward of the ring gear; and
    a controller connected to the auxiliary motor, the controller, including a processor and memory having instructions, configured to command the auxiliary motor to reverse a first direction of rotation of the ring gear to an opposing second direction of rotation during a compression phase of the plunger and then reverse the second direction of rotation of the ring gear back to the first direction of the rotation after the compression phase which maintains a substantially constant speed of the LSB drive line and a substantially constant speed of the plunger crank.

5. The LSB of claim 4, further comprising:
    a brake selectively engaged to deter rotation of the ring gear and to assist increasing rotational speed of the flywheel during start-up.

6. The LSB of claim 4, wherein the controller is configured to command the auxiliary motor to maintain a substantially constant load on an engine of the work vehicle.

7. A large square baler (LSB), comprising:
    an LSB drive line attachable to a power takeoff (PTO) of a work vehicle;
    a plunger crank driving reciprocation of a plunger within a bale chamber;
    a planetary gear train including a sun gear, a ring gear, and a planetary carrier, the ring gear supported on the LSB drive line via a bearing, and the planetary carrier directly connected to the LSB drive line in a 1:1 rotational relationship;
    a flywheel supported on the LSB drive line via a bearing, the flywheel directly connected to the sun gear in a 1:1 rotational relationship;
    an input gear directly connected to the ring gear in a 1:1 rotational relationship;
    an auxiliary motor directly engaging the input gear at a position radially inward of the ring gear;
    a brake selectively engaged to deter rotation of the ring gear and to assist increasing rotational speed of the flywheel during start-up; and
    a controller connected to the auxiliary motor, the controller, including a processor and memory having instructions, configured to command the auxiliary motor to reverse a first direction of rotation of the ring gear to an opposing second direction of rotation during a compression phase of the plunger and then reverse the second direction of rotation of the ring gear back to the first direction of the rotation after the compression phase which maintains a substantially constant speed of the LSB drive line, a substantially constant speed of the plunger crank, and a substantially constant load on an engine of the work vehicle.

8. The torque smoothing apparatus of claim 1, wherein the sun gear and the flywheel are formed as a single piece.

9. The torque smoothing apparatus of claim 1, wherein the input gear and the ring gear are formed as a single piece.

10. The torque smoothing apparatus of claim 1, wherein the sun gear and the flywheel are formed as a single piece, and the input gear and the ring gear are formed as a single piece.

11. The LSB of claim 4, wherein the sun gear and the flywheel are formed as a single piece.

12. The LSB of claim 4, wherein the input gear and the ring gear are formed as a single piece.

13. The LSB of claim 4, wherein the sun gear and the flywheel are formed as a single piece, and the input gear and the ring gear are formed as a single piece.

14. The LSB of claim 7, wherein the sun gear and the flywheel are formed as a single piece.

15. The LSB of claim 7, wherein the input gear and the ring gear are formed as a single piece.

16. The LSB of claim 7, wherein the sun gear and the flywheel are formed as a single piece, and the input gear and the ring gear are formed as a single piece.

\* \* \* \* \*